Figure 1:
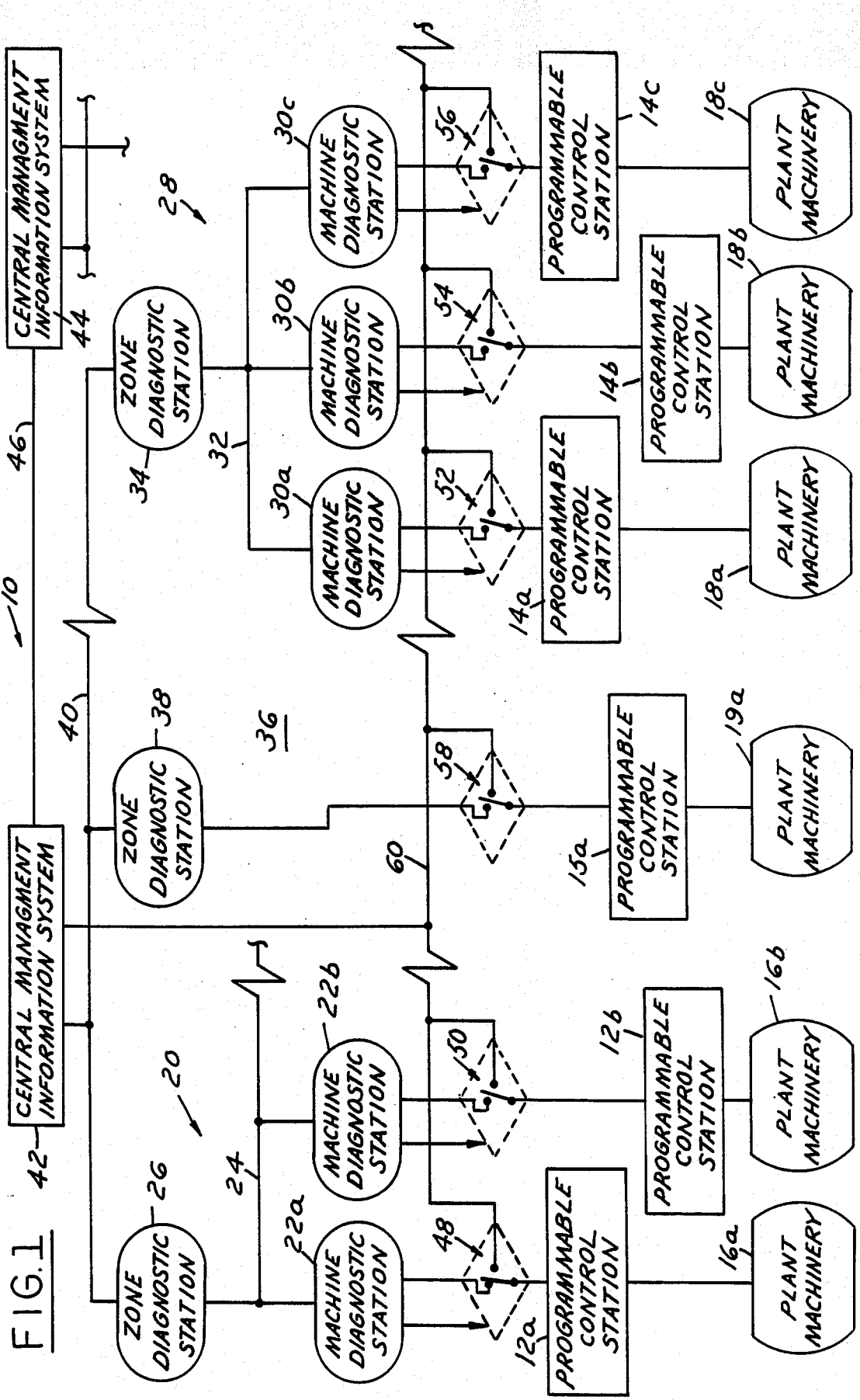

United States Patent [19]

Byal et al.

[11] Patent Number: 4,670,834
[45] Date of Patent: Jun. 2, 1987

[54] SYSTEM AND METHOD FOR AUTOMATIC DIAGNOSTIC PROGRAM MODIFICATION BASED ON CONTROL PROGRAM MODIFICATION

[75] Inventors: Mark Byal, Northville; Francis G. Leo, Mt. Clemens; Marvin J. Schwenke, Utica, all of Mich.

[73] Assignee: Lamb Technicon Corp., Warren, Mich.

[21] Appl. No.: 764,346

[22] Filed: Aug. 12, 1985

[51] Int. Cl.$^4$ .............................................. G06F 15/00
[52] U.S. Cl. ................................... 364/186; 364/131; 371/16
[58] Field of Search ... 364/200 MS File, 900 MS File, 364/184, 186, 131–139; 371/15, 16, 18, 20

[56] References Cited

U.S. PATENT DOCUMENTS

Re. 31,247 5/1983 Johnstone ........................... 364/186
4,138,718 2/1979 Toke ................................... 364/900

Primary Examiner—Charles E. Atkinson
Assistant Examiner—Allen MacDonald
Attorney, Agent, or Firm—Barnes, Kisselle, Raisch, Choate, Whittemore & Hulbert

[57] ABSTRACT

A distributed machine information and control system which includes a plurality of programmable control stations for controlled operation of associated implements of plant machinery. A number of zone diagnostic stations are coupled to one or more programmable control stations, either directly or through individually machine diagnostic stations, for monitoring and diagnosing program-controlled machinery operation. A central management information system receives diagnostic information from the various diagnostic stations for storage and selective reporting of plant operation to management. The system includes facility for uploading to the central system operator-varied control programming from the individual control stations and for automatically downloading diagnostic programming to the diagnostic station which reflects such operator changes in machinery control programming.

5 Claims, 2 Drawing Figures

SYSTEM AND METHOD FOR AUTOMATIC DIAGNOSTIC PROGRAM MODIFICATION BASED ON CONTROL PROGRAM MODIFICATION

The present invention is directed to distributed information systems for monitoring and diagnosing operation of program-controlled plant machinery, and more particularly to a technique for updating diagnostic programming at distributed diagnostic stations to reflect operator-implemented changes in control programming at associated machinery programmable control stations.

Central machine information systems of the type to which the present invention is directed typically include a plurality of programmable control stations for individual control of associated plant machinery. Typical programmable control stations include programmable controllers, programmable logic controllers, weld timers, robot controllers, numerical controllers, computer numerical controllers and distributed network controllers, A number of diagnostic stations are each coupled to one or more programmable control stations and programmed to monitor operation of the programmable control stations and associated plant machinery for quality control and inventory purposes, etc. Typical tasks may include notifying operating personnel of a fault condition, diagnosing the fault, providing a restart sequence of machine operation and analyzing and displaying associated times as they occur, displaying quality control information, counting and displaying machine cycles and parts for maintenance and inventory purposes. The diagnostic stations are coupled to a central management information system information system for storing information indicative of and selectively reporting overall plant operation. The programmable control stations typically include facility for operator variation of control programming to reflect a change of conditions at the machinery, machinery wear, etc. However, failure of diagnostic programming at the associated diagnostic station to reflect such operator variation of machinery control programming may result in erroneous information at the central management information system.

It is a general object of the present invention to provide a method and system for updating such diagnostic programming in distributed machinery information systems of the described character.

Figure 2:
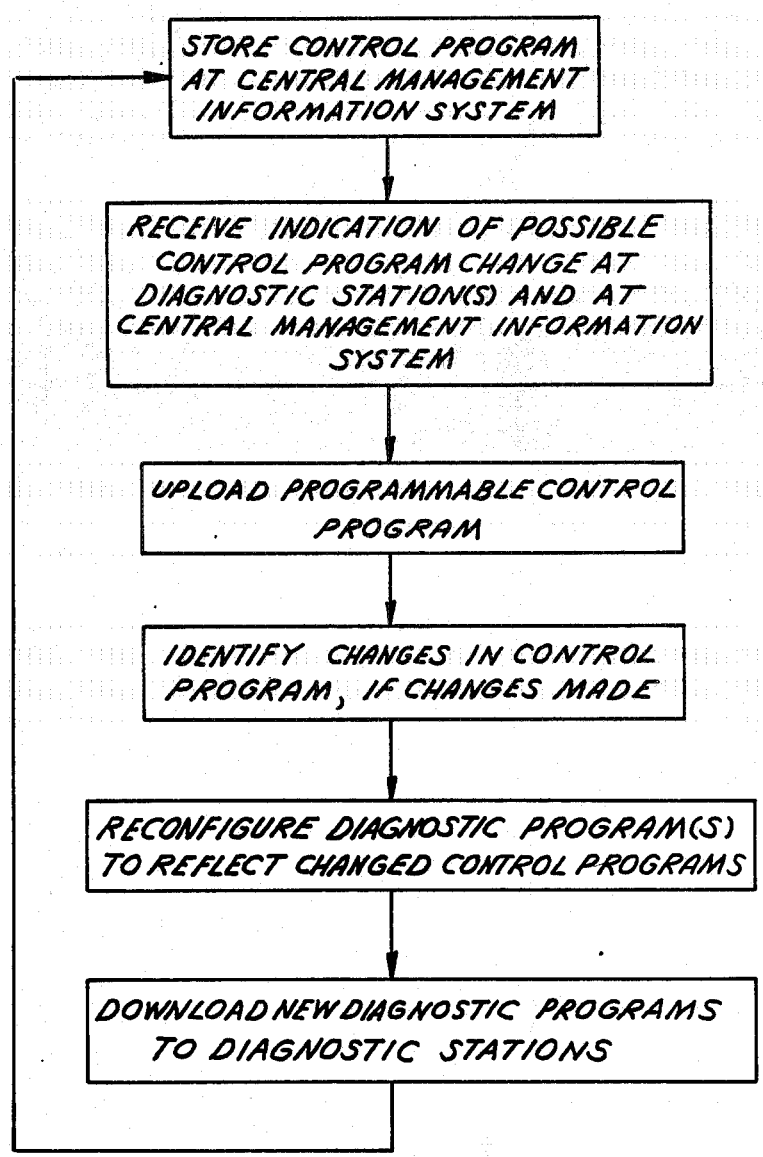

The invention, together with additional objects, features and advantages thereof, will be best understood from the following description, the appended claims and the accompanying drawings in which:

FIG. 1 is a fragmentary functional block diagram of a distributed machine information and control system in accordance with the present invention; and FIG. 2 is a flow chart which illustrates the method of updating diagnostic programming in accordance with the present invention.

FIG. 1 illustrates a distributed machine control and management information system 10 in accordance with the invention as comprising a first plurality of programmable control stations 12a, 12b, a second plurality of programmable control stations 14a, 14b, 14c and a programmable control station 15a each coupled to control an associated article of plant machinery 16a, 16b, 18a, 18b, 18c and 19a respectively. Each article or implement of plant machinery 16a–18b may comprise any typical article of controllable machinery, such as a welding machine, robot or transfer line. Programmable control stations 12a–15a each typically comprise a programmable controller adapted for storage of control programming for the associated article of plant machinery and for implementing operator variations of such control programming through a panel keyboard, for example.

Plant machining 16a, 16b and associated programmable control stations 12a, 12b are connected in a first machine diagnostic zone 20. A first machine diagnostic station 22a has an input adapted to receive information indicative of operation of machinery 16a and contains diagnostic programming for analyzing such information. Likewise, a second machine diagnostic station 22b has an input for receiving information indicative of operation of plant machinery 16b. Each of the machine diagnostic stations 22a, 22b has an I/O port connected by a first communications net 24 to a zone diagnostic station 26 which contains diagnostic programming for receiving, analyzing and correlating information indicative of operation of all plant machinery 16a, 16b within its zone. Plant machinery 18a–18c and associated programmable control stations 14a–14c are likewise connected in a diagnostic zone 28 which includes three associated machine diagnostic stations 30a–30c connected by a bus 32 to a zone diagnostic station 34. Plant machinery 19a and associated programmable control stations 15a are connected in a single-station zone 36 having a zone diagnostic station 38 and no intervening machine diagnostic stations.

Each zone diagnostic station 26, 34, 38 is connected by a communications net 40 to a central management information system 42. Central management information system 42 is linked to other central management information systems 44 by a communications link 46. System 44 is also connected to associated zone diagnostic stations, etc. (not shown). As previously indicated, central management information systems 42, 44 include suitable programming for analyzing and reporting diagnostic information on plant operation. Means, illustrated schematically as electronic switches 48–58, are adapted for selectively connecting the I/O port of each programmable control station 12a–15a to the input port of its associated diagnostic station 22a, 22b, 30a–30c and 38, or for connecting the programmable control stations directly to central management information system 42 through a second communications net 60. The control inputs of switches 48–58 are coupled to corresponding diagnostic stations 22a, 22b, 30a–30c and 38.

In operation, central management information system 42 has stored therein information indicative of the control program at each programmable control station 12a–15a. Preferably, the entire control program at each control station is stored in system 42. Such control programs are likewise stored in the individual programmable control stations 12a–15a, either by entry thereof at the associated programmable control station or by downloading the control program directly from system 42 over communications net 60. Likewise, appropriate diagnostic programming is downloaded from system 42 over net 40 to zone diagnostic stations 26, 34, 38, and further downloaded where appropriate to individual machine diagnostic stations 22a, 22b, 30a–30c over nets 24, 32. The I/O ports of control stations 12a–15c are connected by switches 48–58 to the corresponding diagnostic stations, and operation of plant machinery and the overall control and information system proceeds in the normal manner.

When an operator desires to vary the control program at a programmable control station for whatever reason, the control station is first placed in a standby or program mode, and a corresponding signal is transmitted (as is conventional) by the programmable control station to the associated diagnostic station and thence to the central management information system. When the operator program change is entered, a similar signal is transmitted by the control station and received by the central management information system (FIG. 2). In accordance with the invention, information system 42 then instructs the diagnostic station to activate the switch 48–58 associated with the programmable control station at which the program change occurred so as to connect the associated control station I/O port directly to net 60. Information indicative of the operator program change, preferably the entire changed program, is then uploaded (FIG. 2) along net 60 to central management information system 42. The changed program is compared with the previously-stored control program for the associated control station, and the program change is identified and verified as an allowable change. New diagnostic programming is fashioned within central management information system 42 to reflect such program change and is downloaded along net 40 to associated zone diagnostic station 26, 34 or 38, and thence where appropriate to the individual machine diagnostic station associated with the programmable control station which the change occurred. The diagnostic station is also instructed to reconnect the control station I/O port to the diagnostic station input bus, and the system proceeds in operation as before. The change control program is stored within information system 42 for comparison to new changes as required.

Thus, the invention automatically implements changes and updating in diagnostic programming to reflect operator changes in control programming without requiring reprogramming at the central system or extensive operator intervention. Diagnostic management information indicative of quality control, for example, will continue to reflect actual programming at the control station. One important advantage which the zone diagnostic technique illustrated schematically in FIG. 1 possesses over the prior art is the ability to arbitrate faults among a plurality of plant machinery stations. For example, zone diagnostic station 34 may be programmed to analyze fault information from machine diagnostic stations 30a–30c, which individually sense only that a fault has occurred at its associated plant machinery. Typically, where machinery 18a–18c are in a continuous production line, a significant fault will have occurred at only one machinery station and that station will be delaying operation of the others. Zone diagnostic stations 34 is programmed to arbitrate such fault indication and to indicate to maintenance personnel the machinery station at which the significant fault has occurred.

The invention claimed is:

1. In a machine information system which includes a programmable control station adapted to be selectively programmed for operating plant machinery, a diagnostic station coupled to said programmable control station for monitoring operation at said programmable control station and at the associated plant machinery, and a central management information system coupled to said diagnostic station for storing and selectively reporting operation at said programmable control station and said associated plant machinery, a method of updating diagnostic information at said diagnostic station to reflect a change in control programming at said programmable control station comprising the steps of:
(a) storing in said central management information system information indicative of programming at said programmable control station,
(b) detecting at said central management information system a change in control programming at said programmable control station,
(c) uploading to said central management information system said change in control programming,
(d) comparing said change uploaded in said step (c) to said information stored in said step (a), and then
(e) downloading to said diagnostic station new diagnostic programming to reflect said change in control programming at said programmable control station.

2. The method set forth in claim 1 in a machine information system which includes means between said diagnostic station and said programmable control station for selectively connecting said programmable control station directly to said control management system,
said method comprising the additional steps of:
(f) operating said means following said step (b) to connect said programmable control means directly to said control management information system, and then
(g) uploading in said step (c) the entire changed program at said programmable control directly to said central management information system.

3. The method set forth in claim 2 comprising the step of:
(h) storing said changed program uploaded in said step (g) as said information indicative of programming in said step (a).

4. In a machine information center which includes first and second pluralities of programmable control stations each adapted to store a control program for operating plant machinery and each adapted to selective operator variation of said control program, first and second diagnostic station means each containing diagnostic programming for respectively monitoring operation at said first and second pluralities of programmable control stations and the associated plant machinery, a central management information system coupled to said first and second diagnostic station means for storing information indicative of and selectively reporting operation at said programmable control stations and the associated said plant machinery, a communications net coupled to said central management information system, and means associated with each of said programmable control stations for selectively connecting each said programmable control station to either the associated said diagnostic station means or to said communications net,
a method of updating said diagnostic programming at said diagnostic stations to reflect operator-variation of control programming at a said programmable control station, said method comprising the steps of:
(a) storing at said central management information system information indicative of control programming at each of said programmable control stations,
(b) detecting at said central management information system an operator-variation of control programming of one of said programmable control stations, (c) operating the selectively-connecting means associated with said one programmable control station so as to connect said one station directly to said central management information system through said communications net, (d) uploading the operator-varied control program from said one programmable control station to said central management information system, (e) comparing the operator-varied program upload in said step (d) with said information stored in said step (a), and then, (f) downloading to the diagnostic control station means associated with said one programmable control station new diagnostic programming for said one programmable control station.

5. A machine information center which includes first and second pluralities of programmable control stations each adapted to store a control program for operating plant machinery and each adapted for selective operator variation of said control program, first and second diagnostic station means each containing diagnostic programming for respectively monitoring operation at said first and second pluralities or programmable control stations and the associated plant machinery, a central management information system coupled to said first and second diagnostic station means for storing information indicative of and selectively reporting operation at said programmable control stations and the associated said plant machinery, a communications net coupled to said central management information system, means associated with each of said programmable control stations for selectively connecting each said programmable control station to either the associated said diagnostic station means or to said communications net, and means for updating said diagnostic programming at said diagnostic station means to reflect operator-variation of control programming at a said programmable control station comprising:

means for storing at said central management information system information indicative of control programming at each of said programmable control stations and of diagnostic programming at each of said diagnostic station means; means at said central management information system coupled to said diagnostic station means for detecting an operator-variation of control programming of one of said programmable control stations; means coupled to said central management information system for operating the said selectively-connecting means associated with said one programmable control station so as to connect said one station directly to said central management information system through said communications net; means for uploading the operator-varied control program from said one programmable control station directly to said central management information system over said communications net and for comparing the operator-varied program with said stored information; means responsive to said comparison for automatically updating said diagnostic programming; and means for downloading to the diagnostic control station means associated with said one programmable control station said updated diagnostic programming for said one programmble control station.

* * * * *